April 30, 1929.  L. R. McLAUCHLAN  1,710,938
VACUUM BRAKE FOR AIRPLANES
Filed April 23, 1928
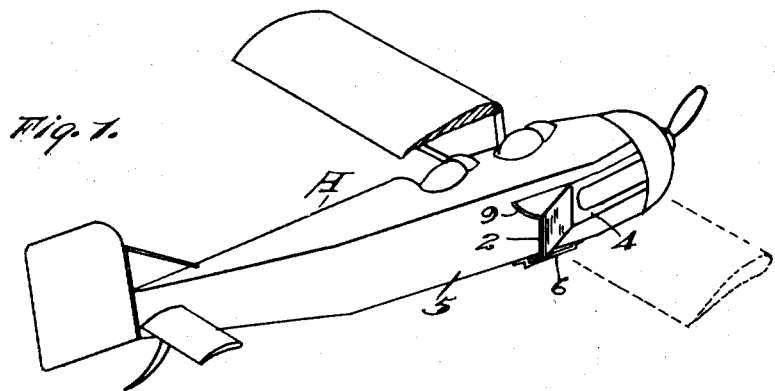
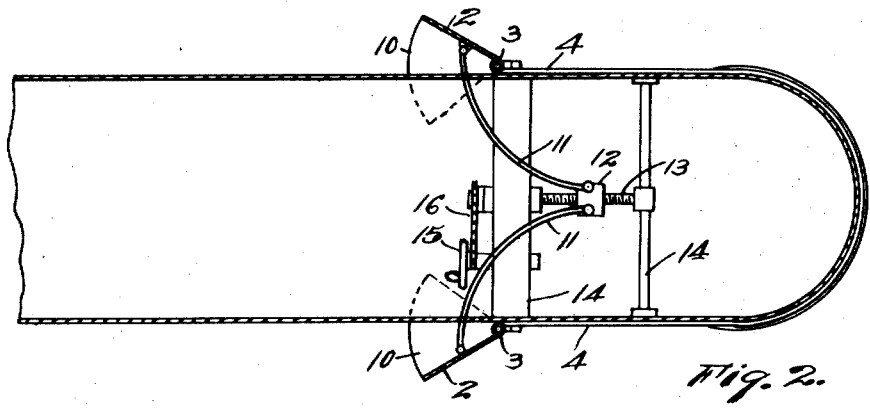
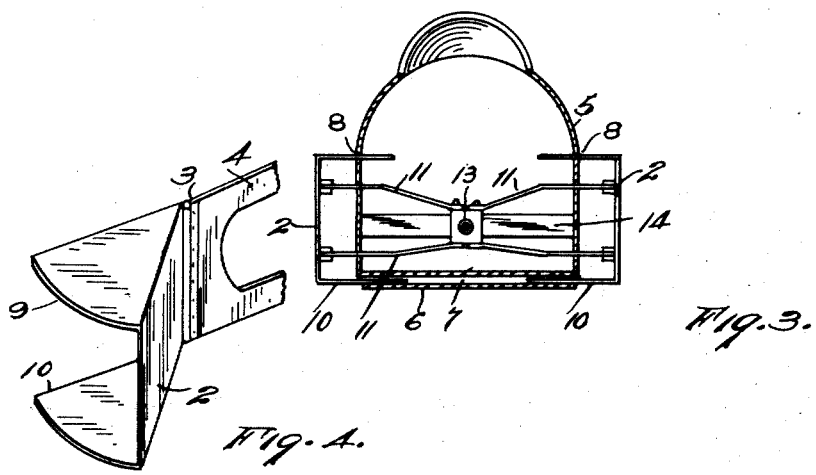
INVENTOR,
L. R. McLauchlan;
BY
*F. E. Maynard*
ATTORNEY.

Patented Apr. 30, 1929.

1,710,938

UNITED STATES PATENT OFFICE.

LEONARD R. McLAUCHLAN, OF LOS ANGELES, CALIFORNIA.

VACUUM BRAKE FOR AIRPLANES.

Application filed April 23, 1928. Serial No. 272,250.

This invention relates to airplanes and more especially to speed control means therefor.

I am aware that it has been proposed to provide various forms of folding plates or blades to the sides or bottom of airplane bodies to be used to check speed.

My present invention has for an object to more especially provide a hooded brake device whereby to form a material vacuum or back pull as well as a plain head resistance.

Also an object is to provide a brake hood which will be highly effective to recover poise of a ship which has gone into tail-spin and therefore enable recovery of flight control or of descent in many cases of emergency.

An object is to provide a simple, substantial and practical vacuum producing brake, of easy and reliable action.

Other objects, advantages and features of construction will be made manifest in the following specification of the herewith illustrative embodiment; it being understood that modifications, variations and adaptations may be resorted to within the scope, spirit and principle of the invention as it is more directly claimed hereinafter.

Figure 1 is a perspective of an airplane showing the brake device.

Figure 2 is a plan and horizontal section of a part of the airplane body.

Figure 3 is a cross-section of the body.

Figure 4 is a perspective of a detached brake and part of its hinge bridle.

The invention consists of a pair of side plates 2 of light, strong metal whose forward edges are hinged at 3 to bridle straps 4 which, for strength of attachment, are hung around the nose of the body 5 of the airplane A.

Secured to the bottom of the body is a false bottom sheet 6 forming an aperture 7.

The body walls are slotted at 8 and the plates 2 are provided with segmental top and bottom leaves 9—10 adapted to move into and out of the slots 8 and the bottom aperture space 7. In other words the bottom leaves are concealed in the closed portions by the false bottom 6, while the upper leaves telescope into the body 5.

At any open position of the hooded wings there will be formed a material back pull by the created vacuum in the hood pocket.

The brake leaves are opened or closed by upper and lower pairs of link braces 11 whose inner ends are attached to a sliding nut 12 on a screw 13 mounted in cross-braces 14. A handle wheel 15 is connected by transmission means 16 to turn the screw when it is desired to extend the brake leaves or retract them.

What is claimed is:

The combination, with an airplane having a fuselage, of speed reducing means including brake plates disposed one on each side of the fuselage and at the forward part thereof, said plates being hinged at their forward edges and having outwardly swinging trailing edges, each plate having upper and lower leaves extending into the fuselage; whereby to form a vacuum chamber at each plate when these are adjusted outward, and means for moving the plates in or out under positive control and locking action at all positions thereof.

LEONARD R. McLAUCHLAN.